United States Patent
Perry et al.

(10) Patent No.: US 8,284,118 B2
(45) Date of Patent: Oct. 9, 2012

(54) POWER SAVING MODE IN PERSISTENTLY ACTIVE MULTI-LAYER DISPLAY SCREEN

(75) Inventors: Paul O. Perry, Lexington, MA (US); Heath Stallings, Colleyville, TX (US); Chivas Nambiar, New Haven, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 672 days.

(21) Appl. No.: 12/417,761

(22) Filed: Apr. 3, 2009

(65) Prior Publication Data
US 2010/0253671 A1    Oct. 7, 2010

(51) Int. Cl.
*G09G 5/00* (2006.01)
(52) U.S. Cl. .......................................................... 345/5
(58) Field of Classification Search ............... 345/1.1–5, 345/87–108, 211–212
See application file for complete search history.

(56) References Cited

U.S. PATENT DOCUMENTS

| | | | |
|---|---|---|---|
| 6,621,541 B1* | 9/2003 | Choi | 349/113 |
| 7,956,820 B2* | 6/2011 | Huitema et al. | 345/3.1 |
| 2008/0007486 A1* | 1/2008 | Fujinawa et al. | 345/5 |
| 2008/0024430 A1* | 1/2008 | Roh | 345/107 |
| 2008/0100906 A1* | 5/2008 | Iftime et al. | 359/296 |
| 2008/0192013 A1* | 8/2008 | Barrus et al. | 345/173 |
| 2010/0309096 A1* | 12/2010 | Inoh | 345/5 |

* cited by examiner

*Primary Examiner* — Sumati Lefkowitz
*Assistant Examiner* — Rodney Amadiz (57) ABSTRACT

A device may include a first display and the second display. The second display may be substantially transparent during an inactive state, and may overlay the first display. In addition, the device may include logic configured to enter a power savings mode upon detecting a first event associated with use of the device, place the second display in the inactive state in the power savings mode, and activate the first display when the second display is in the inactive state.

20 Claims, 9 Drawing Sheets

POWER SAVING MODE IN PERSISTENTLY ACTIVE MULTI-LAYER DISPLAY SCREEN

BACKGROUND INFORMATION

A liquid crystal display (LCD) consumes power when the screen is on, due to its use of backlight, as well as when images on the screen change. Similarly, an organic light-emitting diode (OLED) display also consumes power when images on its screen change. An electronic paper display, also called electronic ink (or "e-ink"), consumes power when images on its surface change, but does not consume power when the screen image is static.

DETAILED DESCRIPTION OF PREFERRED EMBODIMENTS

The following detailed description refers to the accompanying drawings. The same reference numbers in different drawings may identify the same or similar elements.

As described below, a device (e.g., a mobile or cellular telephone, a laptop or notebook computer, a personal computer, etc.) may provide for a persistently active display. The persistently active display may include a lower-layer display and an upper-layer display. The upper-layer display may be capable of turning transparent when it no longer receives power from the device.

In operation, when the device is in a power savings mode, the device turns off or curtails the power delivered to the upper-layer display. Because the upper-layer display turns transparent when inactive, the device may continue to provide images via the lower-layer display. In this manner, the persistently active display may provide dynamic/static images/information to a user during the power savings mode.

Figure 1:
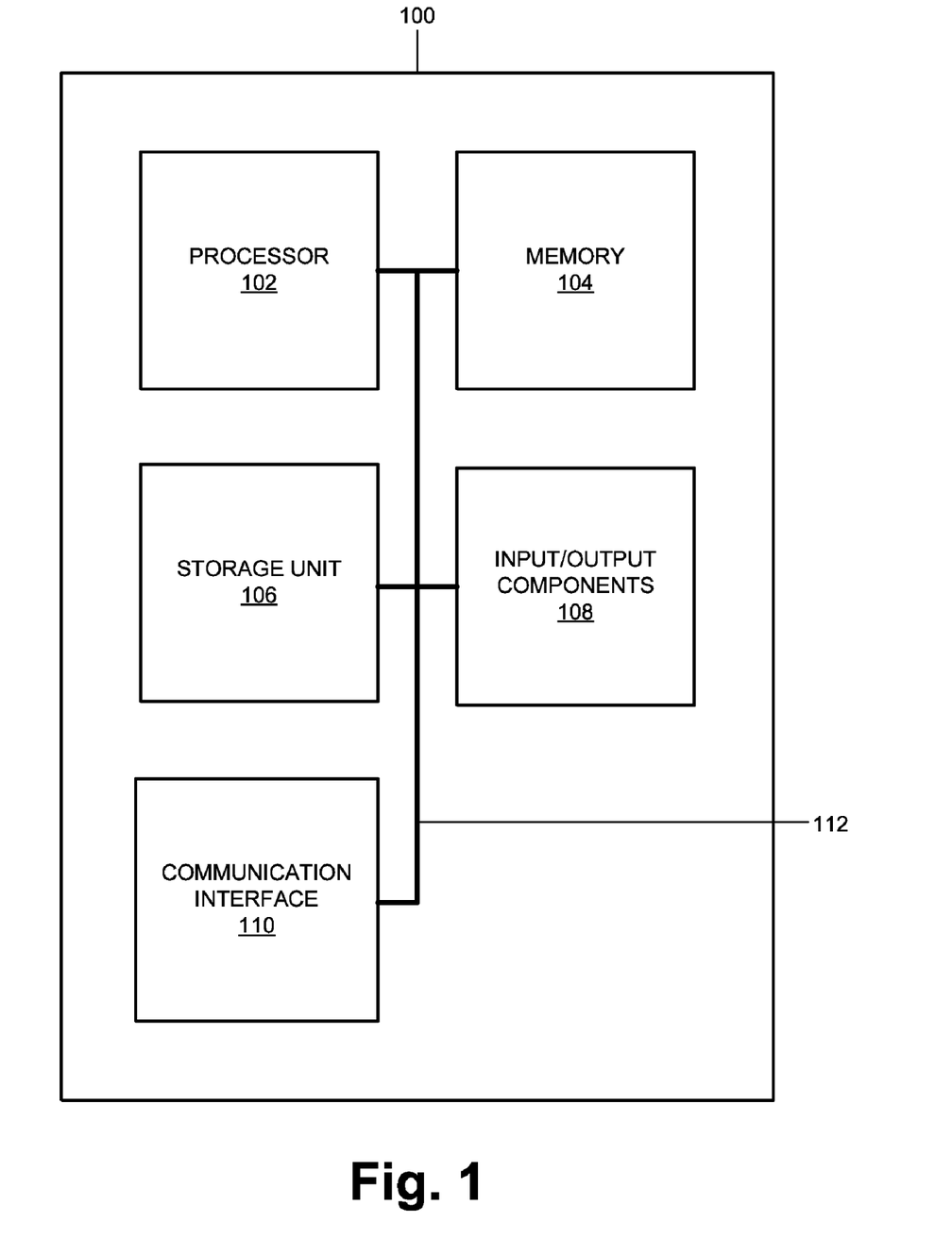
FIG. 1 is a block diagram illustrating an exemplary device in which concepts described herein may be implemented.

FIG. 1 is a block diagram of an exemplary device 100 in which concepts described herein may be implemented. Device 100 may include any of the following devices that have the ability to or are adapted to display or show images or text, such as, for example, a mobile telephone with a display, a personal digital assistant (PDA), a camera/video recorder with a digital viewfinder/display, an electronic notepad, a laptop computer, a personal computer (PC), a wireless/Bluetooth-enabled display, a digital television, a gaming device with a graphics display, etc.

As shown in FIG. 1, device 100 may include a processor 102, memory 104, storage unit 106, input/output components 108, communication interface 110, and bus 112. Processor 102 may include one or more processors, microprocessors, application specific integrated circuits (ASICs), field programmable gate arrays (FPGAs), or other processing logic that may interpret and execute instructions. Memory 104 may include static memory, such as read only memory (ROM), and/or dynamic memory, such as random access memory (RAM), or onboard cache, for storing data and machine-readable instructions. Storage unit 106 may include a magnetic and/or optical storage/recording medium. In some implementations, storage unit 106 may be mounted under a directory tree or mapped to a drive.

Input/output components 108 may include a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to device 100. In addition, input/output components 108 may include a persistently active display (not shown) to provide dynamic/static images/information to a user when device 100 is in the power savings mode.

Communication interface 110 may include any transceiver-like mechanism that enables device 100 to communicate with other devices and/or systems. For example, communication interface 110 may include mechanisms for communicating via a network, such as a wireless network. In these implementations, communication interface 110 may include one or more radio frequency (RF) transmitters, receivers and/or transceivers and one or more antennas for transmitting and receiving RF data. For example, communication interface 110 may include a radio or television tuner, a mobile telephone transceiver, etc. Communication interface 110 may also include a modem or an Ethernet interface to a LAN or other network for communicating with other devices. Bus 112 may provide an interface through which components of device 100 can communicate with one another.

In FIG. 1, device 100 is illustrated as including components 102-112 for the purposes of simplicity. In an actual implementation, device 100 may include additional, fewer, or different components. For example, device 100 may include one or more power supplies, fans, motherboards, video card, etc.

Figures 2A, 2B:
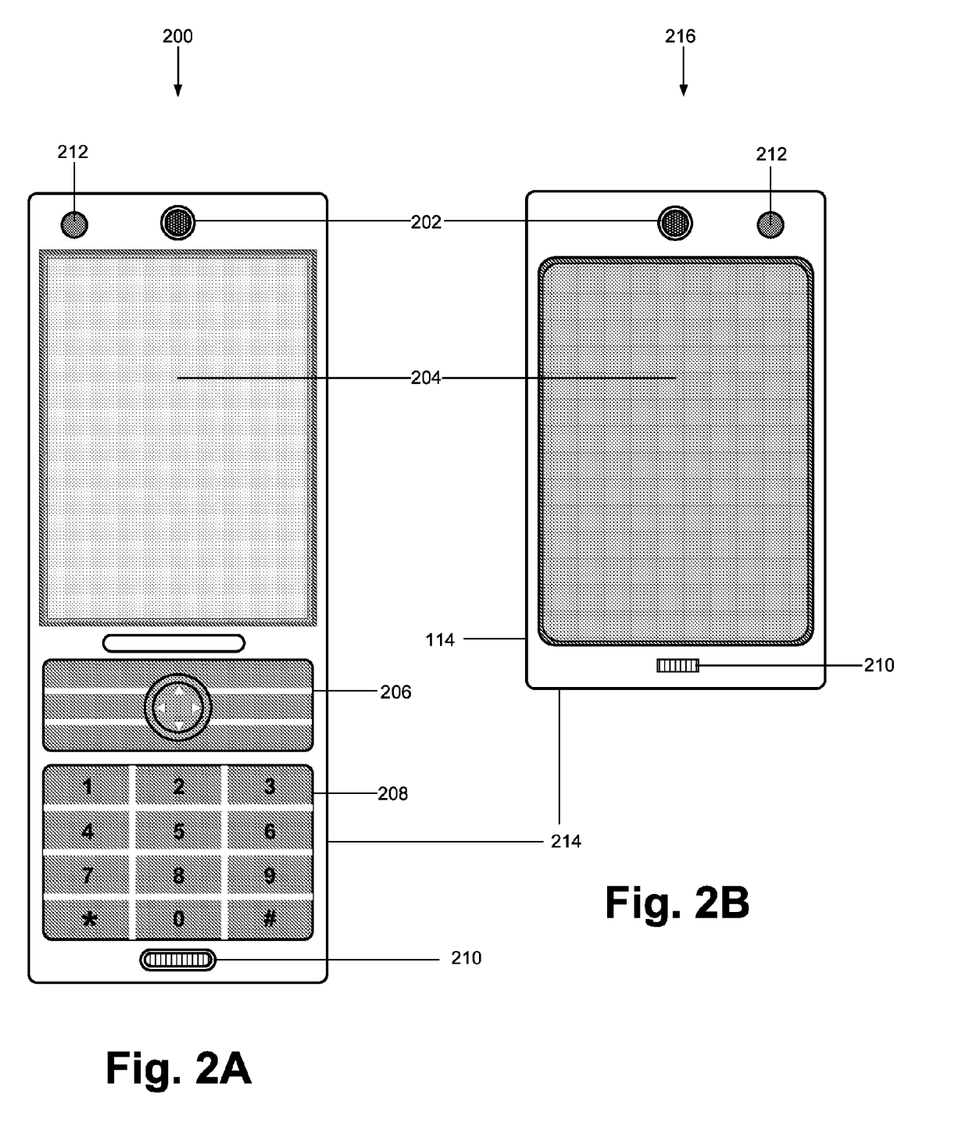
FIG. 2A is a diagram illustrating the device of FIG. 1 according to one exemplary implementation.
FIG. 2B is a diagram illustrating the device of FIG. 1 according to another exemplary implementation.

FIG. 2A is a diagram of device 100 according one exemplary implementation 200. In this implementation, device 100 is in the form of a portable phone (e.g., a cell phone). As shown in FIG. 2A, device 200 includes a speaker 202, display 204, control buttons 206, keypad 208, microphone 210, sensor 212, and housing 214.

Speaker 202 may provide audible information to a user of device 200. Display 204 may provide visual information to the user, such as an image of a caller, video images, or pictures. Display 204 may be implemented as a persistently active display, which will be described in detail below.

Control buttons 206 permit the user to interact with device 200 to cause device 200 to perform one or more operations, such as place or receive a telephone call. Keypad 208 may include a standard telephone keypad. Microphone 210 may receive audible information from the user. Sensors 212 collect and provide, to device 200, information (e.g., ambient light intensity, acoustic information, infrared information, etc.) that may be used to aid the user in capturing images. Housing 214 provides a casing for components of 200 and may protect the components from outside elements. Although not illustrated in FIG. 2A, device 200 may include additional, fewer, or different components, such as a flash, a camera lens assembly, etc.

FIG. 2B is a diagram of device 100 according to another exemplary implementation 216. In FIG. 2B, components that correspond to those in FIG. 2A are labeled with the same numbers. In contrast to device 200, device 216 may provide display 214 that includes a touch screen and a graphical user interface that replaces some of input/output components 108 in device 200, such as control buttons 206 or keypad 208.

Figure 3:
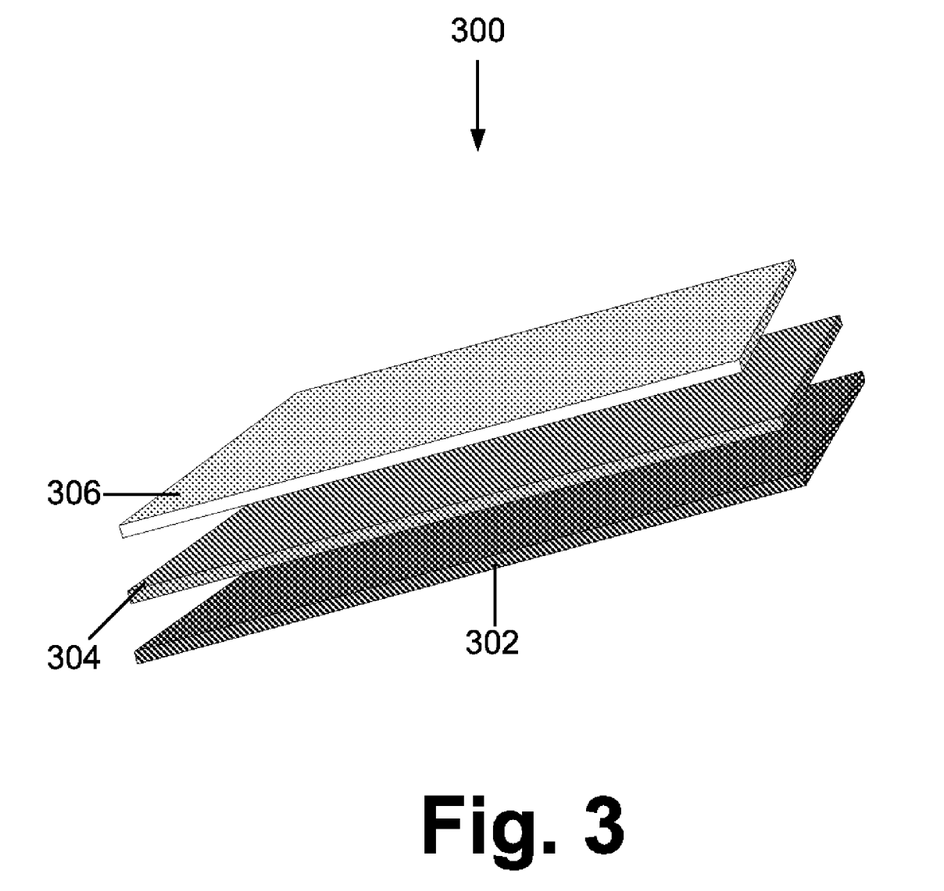
FIG. 3 is a diagram illustrating an exemplary display configuration of the device of FIG. 1.

FIG. 3 is a diagram of a persistently active display of device 100 according to one exemplary implementation 300. As shown, display 300 may include an electronic paper display 302, transparent display screen 304, and touch screen 306.

Electronic paper display 302 may include one or more elements of electronic paper. As used herein, the term "electronic paper" may refer to electronic display(s) for emulating appearance and/or functionalities of an ordinary piece of paper. Electronic paper display 302 may be capable of retaining image/text indefinitely while consuming little or no power. In some implementations, electronic paper display 302 may be thin and flexible. In other implementations, electronic paper display 302 may be assembled on a rigid surface, such as the surface of housing 214.

Transparent display screen 304 may include a transparent liquid crystal display (LCD), a transparent organic light-emitting diode (OLED) display, and/or another type of display that is capable of becoming transparent when it is provided with little or no power. When active, transparent display may be capable of displaying images at a faster rate than electronic paper display 302. However, transparent display 304 may also consume more power, on average, than electronic paper display 302.

Touch screen 306 may include a transparent panel/surface for locating the position of a finger or an object (e.g., stylus) when the finger/object is touching or is close to touch screen 306. Touch screen 306 may overlay transparent display screen 304, but still allow images on transparent display screen 304 and/or electronic paper display 302 to be viewed. In one implementation, touch screen 306 may generate an electric field at its surface and detect changes in capacitance and the electric field on its surface due to a nearby object. A separate processing unit (not shown) that is attached to outputs of touch screen 306 may use outputs to generate the location of disturbances in the electric field, and thus of the object.

Although not illustrated in FIG. 3, depending on the implementation, persistently active display 300 may include additional, fewer, or different components than those illustrated in FIG. 3. For example, in some implementations, transparent conducting panels may be inserted between electronic paper display 302, transparent display screen 304, and/or touch screen 306 to prevent possible interference. In other implementations, touch screen 304 may be omitted.

Figure 4A:
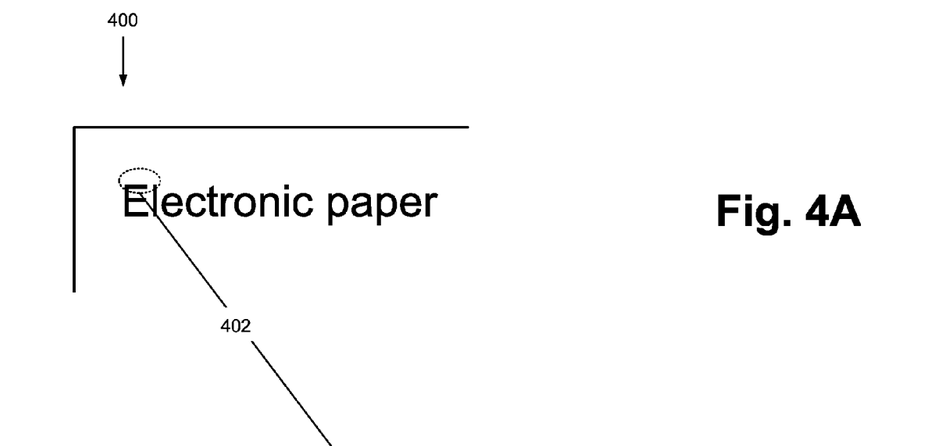
FIG. 4A is a diagram illustrating part of an exemplary electronic paper display of FIG. 3 according to one exemplary implementation.

FIG. 4A is a diagram of a portion 402 of electronic paper display 400 according to one exemplary implementation. Electronic paper display 400 may include picture elements (pixels) that represent images/text on its surface. As illustrated, the pixels on electronic paper display 400 show the text "Electronic paper." As further illustrated, portion 402 of electronic paper display 400 encompasses an area that encircles the top part of the letters "E" and "l" in the text "Electronic paper."

Figure 4B:
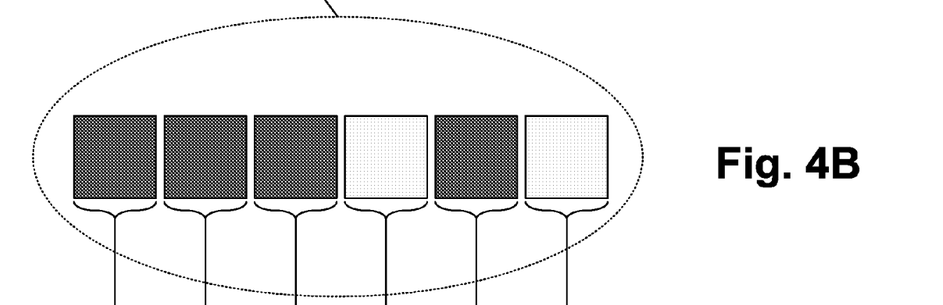
FIG. 4B is an expanded view illustrating a portion of the electronic paper display of FIG. 4A.

FIG. 4B is a diagram of an expanded view of portion 402. As shown, portion 402 may include picture elements 404-1 through 404-6. Although additional pixels may be involved in displaying the word "Electronic paper," they are not illustrated for the purposes of simplicity. Pixels 404-1, 404-2, 404-3, and 404-5 represent dark pixels of portion 402, and pixels 404-4 and 404-6 represent light pixels of portion 402.

Figure 4C:
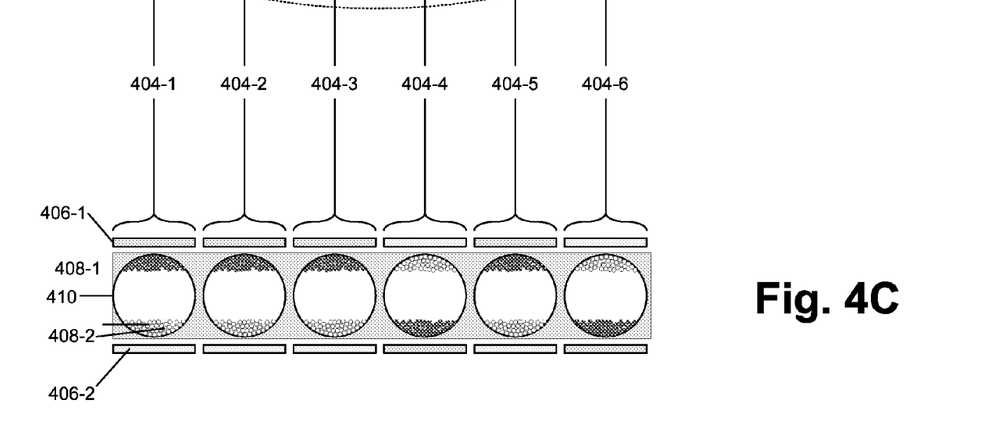
FIG. 4C is a diagram illustrating a cross-sectional view of exemplary picture elements (pixels) of FIG. 4B.

FIG. 4C is a cross-sectional view of pixels 404-1 through 404-6. As shown, pixel 404-1 may include an upper electrode 406-1 and lower electrode 406-2, negatively-charged dark pigment particles 408-1, positively-charged light pigment particles 408-2, and a microcapsule 410. Pixels 404-2 through 404-6 may include similar components as pixel 404-1 and may operate similarly.

Each of upper electrode 406-1 and lower electrode 406-2 may include transparent, conducting material. In operation, an electrostatic potential (e.g., voltage) may be applied to upper electrode 406-1 relative to lower electrode 406-2.

Negatively-charged dark pigment particles 408-1 (e.g., titanium dioxide) and positively-charged light pigment particles 408-2 may include particles that may move about microcapsule 410. In one implementation, positively-charged light pigment particles 408-2 may be reflective (e.g., mirror-like). Microcapsule 410 may include a fluid-filled bubble in which pigment particles 408-1 and 408-2 may be suspended.

In operation, when a positive voltage is applied to upper electrode 406-1 relative to lower electrode 406-2, negatively-charged dark pigment particles 408-1 migrate toward the upper region of microcapsule 410 adjacent to upper electrode 406-1. In such an instance, external light that impinges on the surface of pixel 404-1 is absorbed by negatively-charged dark pigment particles 408-1, and therefore, pixel 404-1 appears dark (e.g., a black or dark gray color, depending on the color of dark pigment particles 408-1). Conversely, when a negative voltage is applied to upper electrode 406-1 relative to lower electrode 406-2, positively-charged light pigment particles 408-2 collect about the upper region of microcapsule 410. Consequently, positively-charged light pigment particles 408-2 reflect external light that impinges on the surface of light pigment particles 408-2, and pixel 404-1 appears white.

In this manner, depending on various voltages that are applied to the upper and lower electrodes, each of the pixels in electronic paper display 400 appears black or white. By controlling the voltages on each pixel, electronic paper display 400 can be made to display desired images/text.

Depending on the implementation, electronic paper display 410 may be configured or assembled in various ways. For example, in FIG. 4C, pigment particles 408-1 and 408-2 are depicted as being negatively and positively charged, respectively. In some implementations, pigment particles 408-1 may be positively charged. In other implementations, upper electrodes may be connected to a ground potential.

In one implementation, microcapsule 410 may include white pigment particles and dark fluid. In such a case, migration of the white pigment particles due to voltage changes on electrodes 406-1 and 4406-2 may displace the dark fluid near the top of microcapsule 410. This may cause pixel 404-1 to appear white.

In another implementation, a color filter may be affixed to the top of each upper electrode in electronic paper display 400. In such an implementation, each pixel 404-1 may operate as a colored sub-pixel in electronic paper display 400, allowing electronic paper display 400 to display color images or text. In yet another implementation, instead of charged pigment particles (e.g., particles 408-1 or 408-2), microcapsule 410 may be filled with two disparate liquid mediums, such as a dark oil and a light, water-based fluid. Depending on the voltage applied between upper and lower electrodes 406-1 and 406-2, the dark liquid may float to the upper region of microcapsule 410, to reflect or absorb incoming light.

Electronic paper display 410 may be implemented or printed on different types of surfaces/substances, including plastic, glass, etc.

Figure 5A:
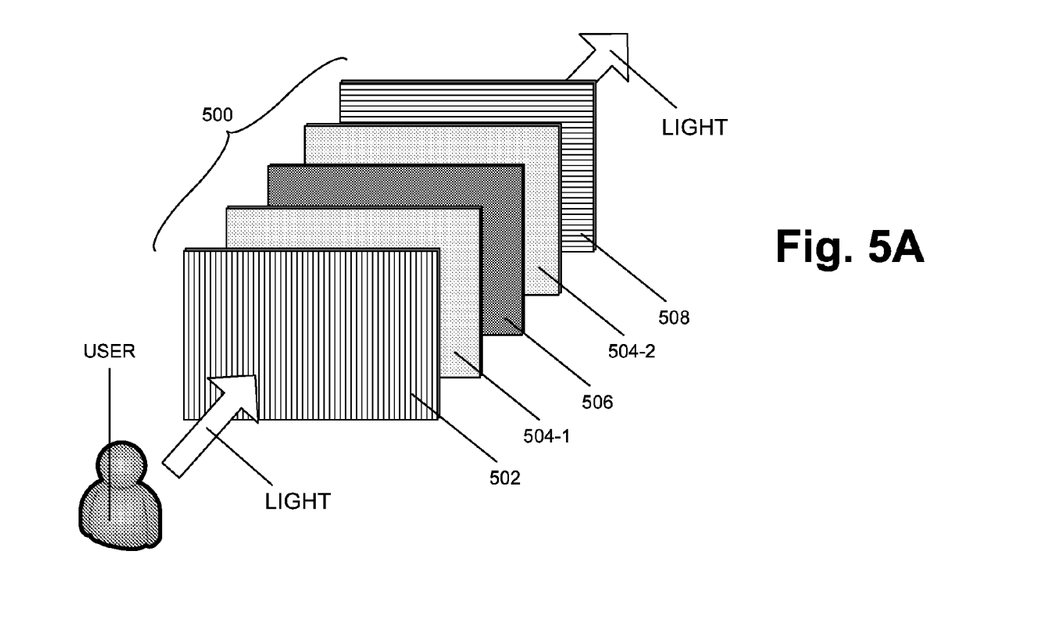
FIG. 5A is a diagram illustrating components of a transparent display screen of FIG. 3 according to one exemplary implementation.

FIG. 5A is a diagram illustrating components of transparent display screen 500 according to an exemplary implementation. In this implementation, transparent display screen 500 may take the form of a LCD. As shown, transparent display screen 500 may include a polarizing filter 502 (e.g., a vertically polarizing film deposited on a glass substrate), electric circuits 504-1 and 504-2, liquid crystal 506 (e.g., nematic liquid crystal, ferroelectric liquid crystal, etc.), and polarizing filter 508 (e.g., a horizontally polarizing film deposited on a glass substrate). In an actual implementation, transparent display screen 500 may include additional, fewer, or different components than those illustrated in FIG. 5A. For example, transparent display screen 500 may include color filters.

Polarizing filter 502 may include a medium that permits light (e.g., light entering transparent display screen 500 in the direction of the arrow in FIG. 5A) that is polarized in one direction (e.g., vertical). Electronic circuits 504-1 and 504-2 may include components that can cause properties of liquid crystal 506 to change.

Liquid crystal 506 may include a substance that changes the polarization of light passing through liquid crystal 506 when electronic circuits 504-1 and 504-2 are active. Polarizing filter 508 may include a medium that permits light polarized in a particular direction (e.g., horizontal) to exit transparent display screen 500.

Figure 5B:
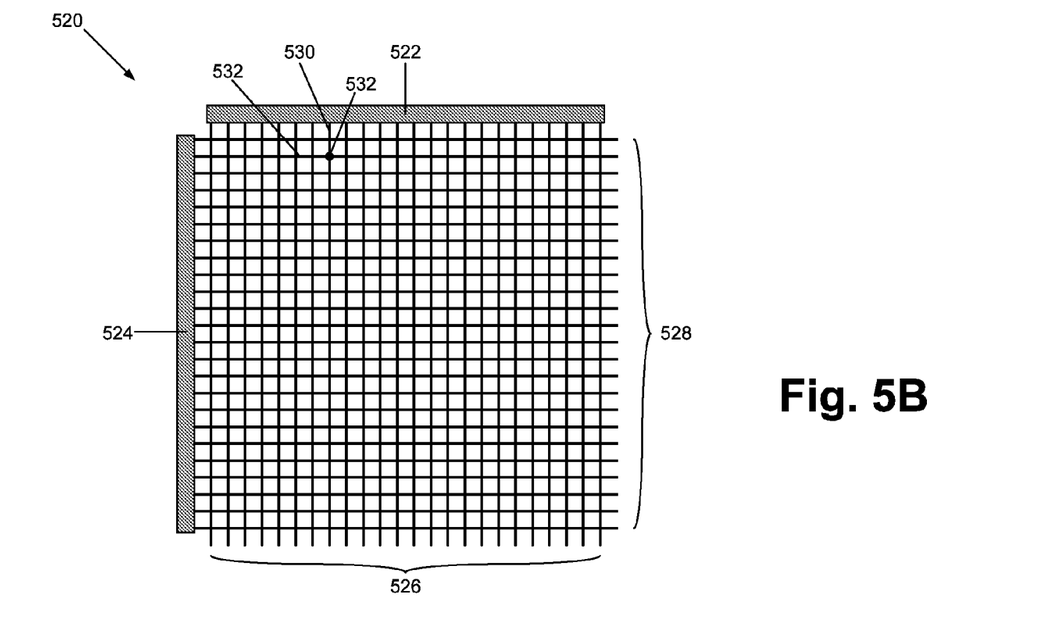
FIG. 5B is a diagram illustrating exemplary pixels of the transparent display screen FIG. 5A.

FIG. 5B is a diagram illustrating exemplary picture elements 520 of transparent display screen 500. As shown, picture elements 520 may include a horizontal terminal 522 and a vertical terminal 524.

In one implementation, horizontal terminal 522 and vertical terminal 524 may be included in electronic circuits 504-1 and 504-2, respectively. In such an implementation, as further shown in FIG. 5B, horizontal terminal 522 and vertical terminal 524 may be connected to columns 526 and rows 528 of conducting lines (e.g., wires), respectively. The intersections of columns 526 and rows 528 may correspond to the locations of pixels on liquid crystal 506 that is sandwiched between electronic circuits 504-1 and 504-2.

In operation, by the virtue of control circuitry connected to electronic circuits 504-1 and 504-2, particular conducting columns and rows of conducting lines 526 and 528 may be activated. For example, in FIG. 5B, a voltage may be applied to column 530 relative to row 532. In such an instance, pixel 532 on liquid crystal 506 may modify the polarization of incident light that passes through pixel 532. Consequently, the polarization of light that exits pixel 532 no longer matches the polarization of filter 508. This prevents the light from passing though filter 508. When the voltage is removed from column 530 and row 532, pixel 532 no longer modifies the polarization of the light, allowing the light to passes through filter 508.

In accordance with the above, electronic circuits 504-1 and 504-2 control which pixels on liquid crystal 506 permit/allow light to pass through transparent display screen 500. When no voltage is applied to any of columns 526 and rows 528, light passes through the whole of display screen 500, rendering it substantially transparent.

In a different implementation, in place of columns 526 of conducting lines, electronic circuit 504-1 may include a matrix of active, transparent transistors/capacitors that are located over the pixels in liquid crystal 506. Electronic circuit 504-2 may be connected to the ground potential. To activate a particular pixel, electronic circuits 504-1 and 504-2 may turn on a transistor/capacitor that corresponds to the particular pixel.

If transparent display screen 500 is implemented as a reflective LCD, for a user to view an image that is displayed on transparent display screen 500, ambient light that enters polarizing filter 502 and exits polarizing filter 508 in the direction of the displayed arrows (FIG. 5A) needs to be reflected back to the user. In such an implementation, microcapsules in electronic paper display 302 that are underneath transparent display screen 500 may include pigment particles that are capable of providing sufficient reflectivity for transparent display screen 500 to display images/text. That is, electronic paper display 302 may provide a reflecting surface for transparent display screen 300 when transparent display screen 300 is active.

If transparent display screen 500 is implemented as a transmissive LCD, for a user to view an image that is displayed on transparent display screen 500, a backlight/sidelight may be provided for transparent display screen 500. In such an implementation, electronic paper display 302 may provide a dark surface for transparent display screen 300 when transparent display screen 300 is active.

Figure 6:
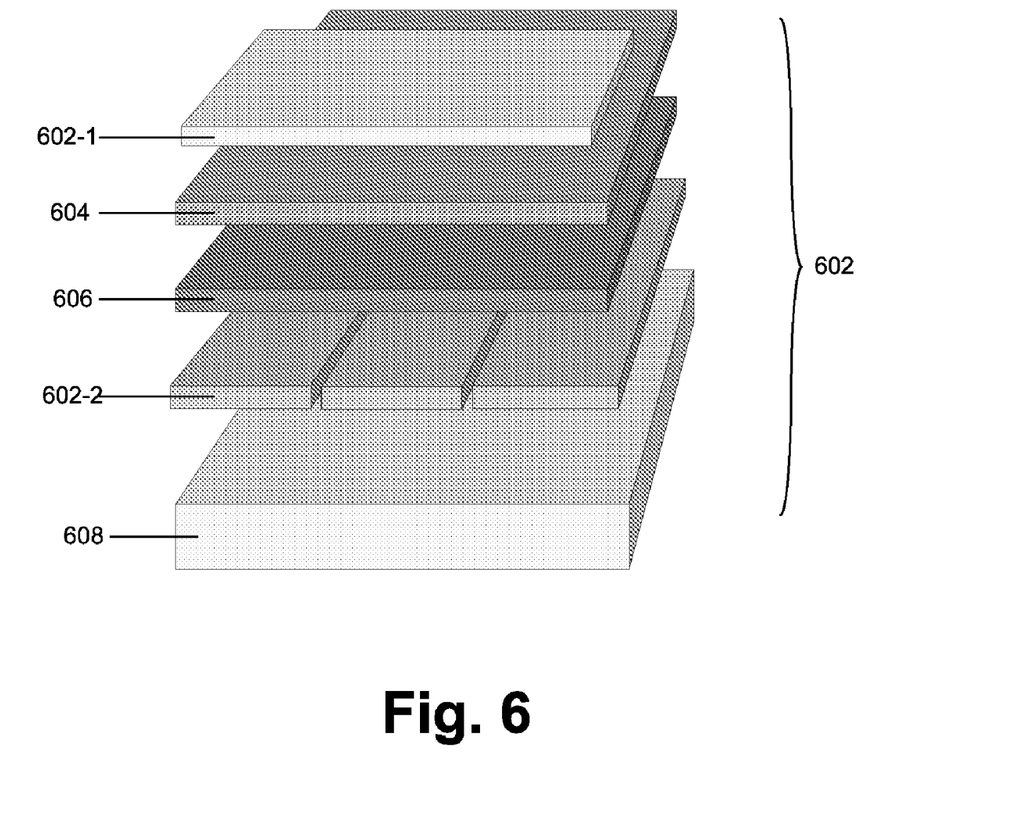
FIG. 6 is a diagram illustrating exemplary components of the transparent display screen of FIG. 3 according to another exemplary implementation.

FIG. 6 is a diagram illustrating components of transparent display screen 304 according to another exemplary implementation. In this implementation, transparent display screen 304 may take the form of an OLED display. As shown, transparent display screen 304 may include an OLED 600, which may implement a pixel or a sub-pixel of transparent display screen 304. OLED 600 may emit light when OLED 600 is active/turned on (e.g., current flow through OLED) via a control circuitry connected to OLED 600.

As further shown in FIG. 6, OLED 600 may include a cathode 602-1, anode 602-2, light-emitting organic layer 604, conducting organic layer 606, and substrate 608. Cathode 602-1 and anode 602-2 may provide a voltage potential between components that are assembled between cathode 602-1 and anode 602-2. Light-emitting organic layer 604 may emit light when electrons pass from cathode 602-1 to conducting organic layer 606. Conducting organic layer 606 may provide "holes" that accept electrons from light-emitting organic layer 606 and that pass electrons to anode 602-2.

In the above, each of components 602-1 through 608 is transparent, such that OLED 600 is transparent when OLED 600 is turned off. In a different implementation, anode 602-2 may be overlaid on top of a transparent, thin film transistor array that controls which OLED 600 is turned on. Depending on the implementation, OLED 600 may include additional or different components than those illustrated in FIG. 6.

Figure 7:
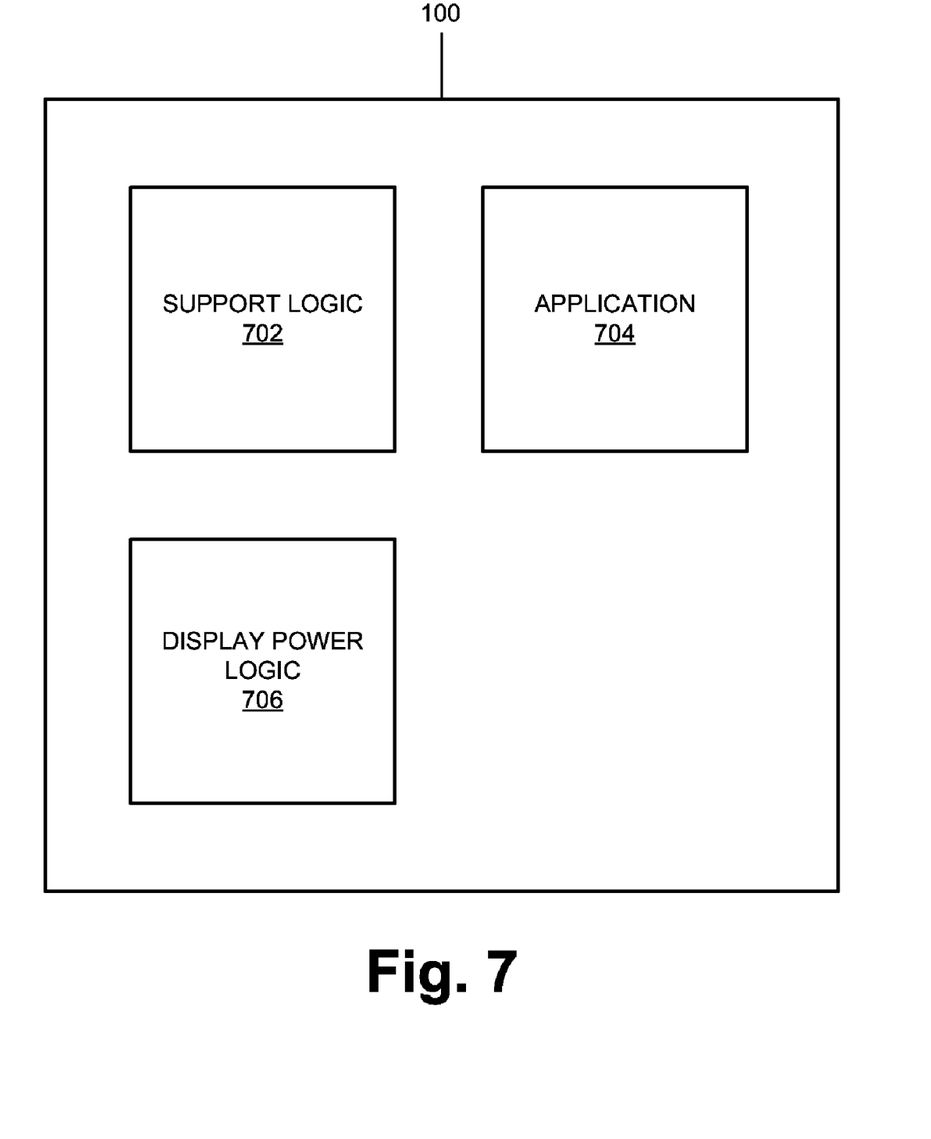
FIG. 7 is a block diagram illustrating exemplary functional components of the device of FIG. 1.

FIG. 7 is a block diagram illustrating exemplary functional components of device 100. As shown, device 100 may include support logic 702, application 704, and display power logic 706. Depending on the implementation, device 100 may include additional, fewer, or different functional components than those illustrated in FIG. 7. For example, in some implementations, display power logic 706 may be incorporated in application 704 or in support logic 702.

Support logic 702 may include a computer program (e.g., an operating system, a device driver, etc.) for managing hardware and software resources of device 100 and for performing various support functions for applications that are executing on device 100. For example, support logic 702 may provide a TCP/IP stack to support a communication application. Support logic 702 may also provide interfaces between the applications and the components in FIG. 1 (e.g., input/output components 108, communication interface 110, display drivers, etc.).

Application 704 may include software programs that provide services to the user either in stand-alone mode or in conjunction with server applications. Examples of application 704 include a web browser, a document editor/processor, an email client, widgets (e.g., small applications), etc. In some implementations, application 704 may invoke functionalities that are provided by display power logic 706 and/or accept notifications from display power logic 706.

Display power logic 706 may notify application 704 when power to persistently active display 300 is reduced or cut off or when power to persistently active display 300 is fully restored.

In one implementation, application 704 and/or display power logic 706 may operate in conjunction. For example, assume that application 704 displays a stock ticker symbol on persistent display 300. When display power logic 706 notifies application 704 that device 100 is in a power savings mode, application 704 may query display power logic 706 whether device 100 includes persistently active display 300. When display power logic 706 answers in the affirmative, application 704 may cause electronic paper display 400 to display the stock ticker symbol via device drivers included in support logic 702. Because transparent display screen 304 that overlays electronic paper display 400 becomes transparent during the power savings mode, the user may be able to view the stock ticker symbol provided via electronic paper display 400.

In a different implementation, application 704 may invoke services that are provided by support logic 702 or display power logic 706 to access graphics capabilities of electronic paper display 400. In such an implementation, display power logic 706 and/or support logic 702 may handle any issues that may arise when application 704 sends images/text to electronic paper display 400.

Figure 8:
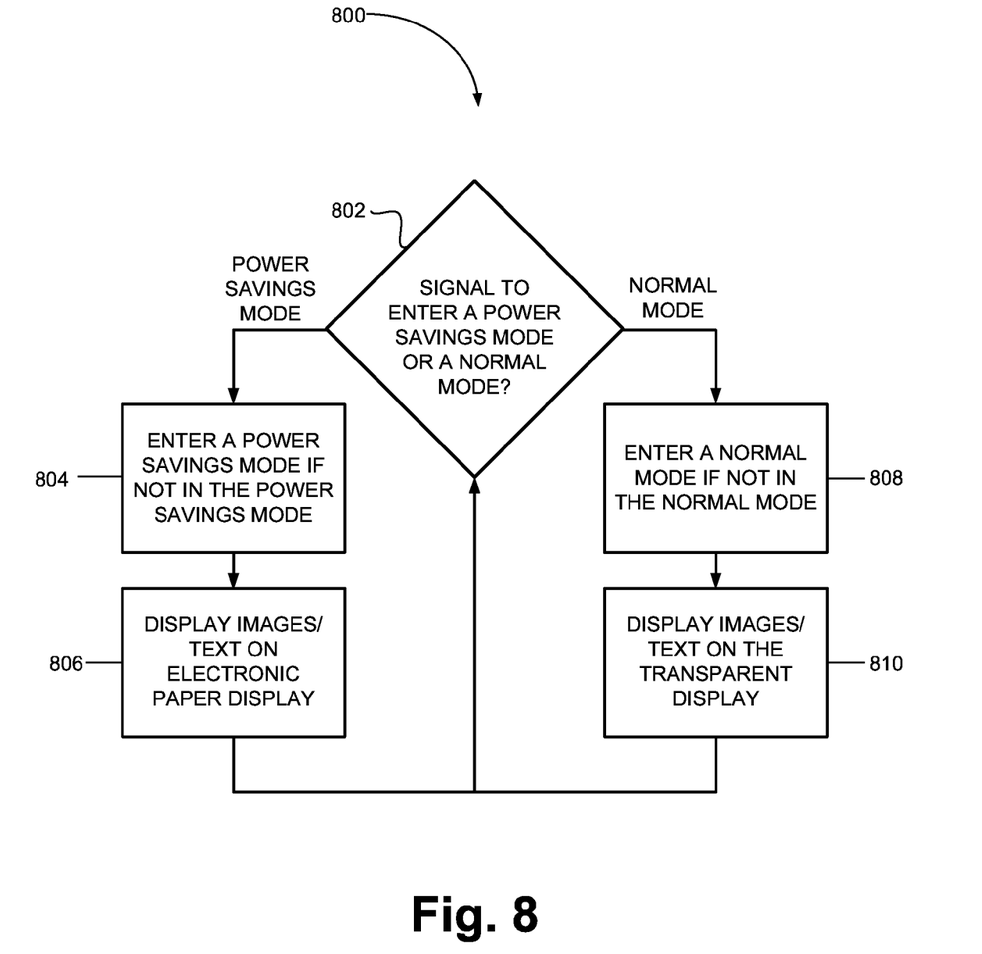
FIG. 8 is a flow diagram of an exemplary process that is associated with operation of the display of FIG. 3.

FIG. 8 is a flow diagram of an exemplary process 800 that is associated with operation of persistently active display 300. Assume that device 100 is turned on, and that display power logic receives a signal from device 100. As shown, process 800 may start at block 802, where display power logic 706 determines whether the signal indicates device 100 is to enter a power savings mode or a normal mode (block 802). For example, in one implementation, a user may instruct, via a graphical user interface, device 100 to enter a power savings mode (e.g., to save battery). Upon receiving the instruction, device 100 may send a signal to display power logic 706, indicating that device 100 is entering the power savings mode. In another example, device 100 may determine that a user has not provided input to the device or that device 100 has not received a request for communication from a remote device (e.g., an incoming call, a text message, an email message, etc.) for a particular amount of time. In this situation, device 100 may send a signal for the power savings mode to display power logic 706. In yet another example, when the user presses one of control buttons 206 or device 100 receives a request for communication from a remote device, device 100 may generate a signal that indicates device 100 is entering the normal mode.

At block 802, if display power logic 706 receives a signal that indicates the power savings mode (block 802—POWER SAVINGS MODE SIGNAL), process 800 may proceed to block 804. At block 804, if persistently active display 300 is not already in the power savings mode, display power logic 706 may drive persistently active display 300 to enter the power savings mode (block 804). This may entail curtailing or cutting off power that is being delivered to transparent display screen 304.

In addition, display power logic 706 may notify application 704 that transparent display screen 304 is no longer active and that application 704 now may display images/text on electronic paper display 302. In a different implementation, instead of being notified by display power logic 706, application 706 may query support logic 702/display power logic 706 to determine whether application 706 is to display images on electronic paper display 302 or on transparent display screen 304.

Application 704 may display images/text on electronic paper display 302 (block 806). In displaying the images/text, application 704 may use either a device driver for electronic paper display 302 or display power logic 706. In the latter case, display power logic 706 may act as an intermediary between the device driver for electronic paper display 302 and application 704.

At block 806, process 800 may return to 802 (e.g., at a next, periodic, polling period), to determine whether a signal to enter the power savings mode or the normal mode is received.

Returning to block 802, if display power logic 706 receives a signal that indicates the normal mode (block 802—NORMAL MODE), process 800 may proceed to block 808. At block 808, if device 100 is not already in the normal mode, display power logic 706 may turn on/restore power to transparent display screen 304. If transparent display screen 304 is implemented as a reflective LCD (e.g., a transflective LCD, etc.), display power logic 706 may also cause electronic paper display 302 to provide a reflecting surface for transparent display screen 304 and to operate as a mirror for transparent display screen 304.

In addition, display power logic 706 may notify application 704 that transparent display screen 304 is active. In a different implementation, instead of being notified by display power logic 706, application 706 may query support logic 702/display power logic 706 to determine whether application 706 is to display images on electronic paper display 302 or on transparent display screen 304.

Application 704 may display images/text to transparent display screen 304 (block 810). In sending the images/text, application 704 may display images/text on transparent display screen 304 via either display power logic 706 or a device driver for transparent display screen 304. In the former case, display power logic 706 may act as an intermediary between the driver and application 704.

At block 810, process 800 may return to block 802 to continue to respond to signals for normal mode/power savings mode (e.g., at a next, periodic, polling period).

Figure 9A:
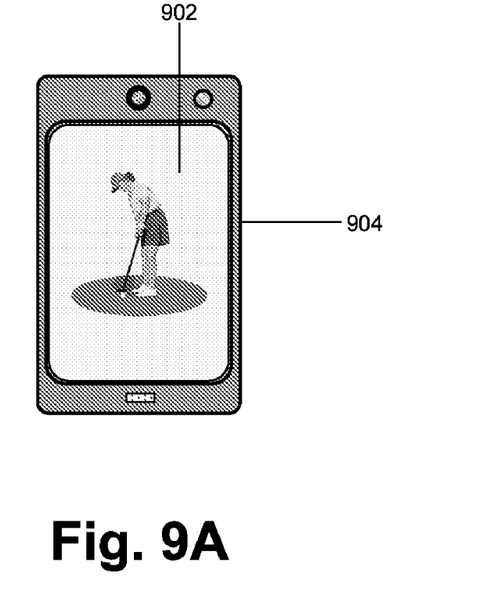
FIGS. 9A and 9B illustrate an example associated with the operation of the display of FIG. 3.
Figure 9B:
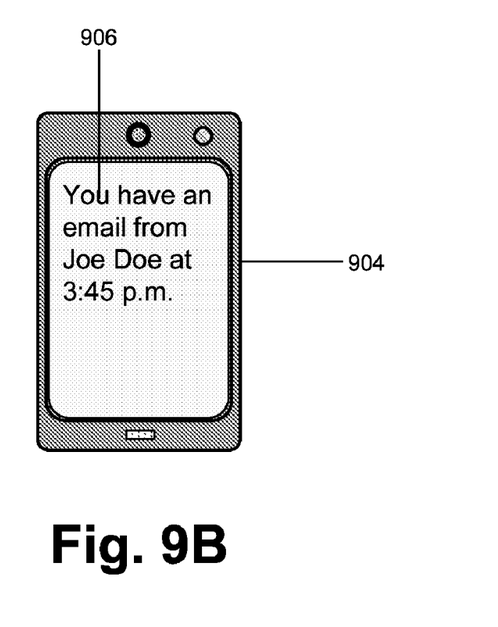

The following example, in conjunction with FIGS. 9A and 9B, illustrate processes associated with persistently active display 300 in accordance with implementations described above.

Assume that persistently active display 300 is implemented as a display 902 of a cell phone 904. In addition, assume that John is watching golf via stream video. Cell phone 904 detects that John is actively engaged in using cell phone 904 (e.g., via various input components, such as a touch screen) and generates signals that are associated with the normal node. Cell phone 904 sends images/text to transparent display screen 304 of display 902.

After watching for an hour, John realizes that cell phone 904 is running out of power. John, via a GUI on cell phone 904, puts cell phone 904 in a power-savings mode. Cell phone 904 sends a signal associated with the power-savings node to display power logic 706 in cell phone 904. In response, display power logic 706 cuts off power to transparent display screen 304 of display 902.

As John carries cell phone 904, cell phone 904 displays text alerts on whether cell phone 904 has received new messages on electronic paper display 302 of display 902. As illustrated in FIG. 9B, because transparent display screen 304 becomes transparent when it does not receive power, an alert 906 is visible on display 902.

The above example illustrates how persistently active display 300 may operate or may be used. As discussed, persistently active display 300 may include electronic paper display 302 and transparent display screen 304. In the power savings mode, transparent display screen 304 may no longer receive full power from device 100, and therefore, turn transparent. This may allow electronic paper display 302 underneath transparent display screen 304 to provide dynamic/static images/information to the user during the power savings mode.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of acts have been described with respect to FIG. 8, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
    a first display;
    a second display, wherein the second display is substantially transparent during an inactive state, the second display overlaying the first display; and
    logic configured to:
        determine that an active state of the second display corresponds to one of a reflective mode or a transmissive mode;
        control, when the active state of the second display corresponds to the reflective mode, electronic properties applied to the first display to provide a reflective surface with respect to the second display;
        control, when the active state of the second display corresponds to the transmissive mode, electronic properties applied to the first display to provide a light-absorbing surface with respect to the second display;
        enter a power savings mode upon detecting a first event associated with use of the device;
        place the second display in the inactive state in the power savings mode; and
        activate the first display when the second display is in the inactive state.

2. The device of claim 1, wherein the device includes:
    a mobile phone, a personal digital assistant, a laptop, or a computer.

3. The device of claim 1, wherein the second display includes:
    a transparent liquid crystal display (LCD); or
    a transparent organic light emitting diode (OLED) display.

4. The device of claim 3, wherein the second display includes the transparent OLED display, and the transparent organic light emitting diode display includes:
    transparent transistor arrays that correspond to pixels.

5. The device of claim 3, wherein the second display includes the LCD, and the transparent liquid crystal display includes:
    a nematic liquid crystal whose active pixel is not transparent.

6. The device of claim 1, wherein the first display includes:
    an electronic paper display.

7. The device of claim 6, wherein the electronic paper display includes capsules that include at least one of:
    dark pigment particles and light pigment particles.

8. The device of claim 7, wherein the light pigment particles include reflective pigment particles.

9. The device of claim 1, wherein the logic is further configured to:
    receive user input that instructs the device to enter the power savings mode and generates the first event; and
    generate the first event when user input is not received at the device for a particular amount of time.

10. The device of claim 1, wherein the logic is further configured to:
    generate a second event when the device receives user input or a request for communication from a remote device; and
    exit the power savings mode upon detecting the second event.

11. The device of claim 10, wherein the request for communication includes:
    an email message, an incoming phone call, or an incoming text message.

12. The device of claim 1, wherein the first display, on average, consumes more power than the second display.

13. The device of claim 12, wherein the first display is capable of displaying video images at a faster rate than the second display.

14. A method comprising:
 determining whether a device that includes a first display and a second display is entering a power savings mode, the first display overlaying the second display;
 displaying images on the second display when the device is in the power savings mode;
 deactivating the first display in the power savings mode;
 rendering the first display transparent in the power savings mode;
 selectively operating, when the device is not in the power savings mode, the first display in one of a reflective mode or a transmissive mode;
 providing, via the second display, a reflective surface with respect to the first display when the first display is in the reflective mode; and
 providing, via the second display, a light-absorbing surface with respect to the first display when the first display is in the transmissive mode.

15. The method of claim 14, further comprising one of:
 receiving user input that instructs the device to enter the power savings mode; or
 not receiving user input or a request for communication from a remote device for a particular amount of time.

16. The method of claim 15, wherein displaying images on the first display includes:
 causing pigment particles in a selected group of pixels to migrate toward upper regions of the pixels.

17. The method of claim 14, further comprising:
 receiving user input or a request for communication from a remote device;
 exiting the power savings mode upon receiving the user input or the request for communication from the remote device; and
 activating the first display upon exiting of the power savings mode.

18. The method of claim 17, further comprising:
 removing, based on the determining that the device is entering the power savings mode, images from the second display; and
 providing a reflective surface comprises causing the second display to operate as a mirror for the first display.

19. A device comprising:
 an electronic paper display affixed to the device;
 a liquid crystal display (LCD) that turns transparent when the LCD no longer receives power, the LCD formed over the electronic paper display;
 a transparent touch screen for receiving user input; and
 a processor configured to:
  exit a power savings mode upon receiving input signals from the transparent touch screen or an incoming request for communication;
  restore power to the LCD upon exiting the power savings mode;
  selectively display images on the LCD in one of a transmissive mode or a reflective mode; and
  cause the electronic paper display to selectively turn:
   dark when the LCD is operated in the transmissive mode, and
   reflective when the LCD is operated in the reflective mode.

20. The device of claim 19, wherein the electronic paper includes:
 fluid that flows toward an upper surface of the electronic paper to absorb light incident upon the upper surface.

* * * * *